Nov. 15, 1955     I. B. LUECK     2,723,594
LENS TESTING INSTRUMENT
Filed Jan. 19, 1953     2 Sheets-Sheet 1
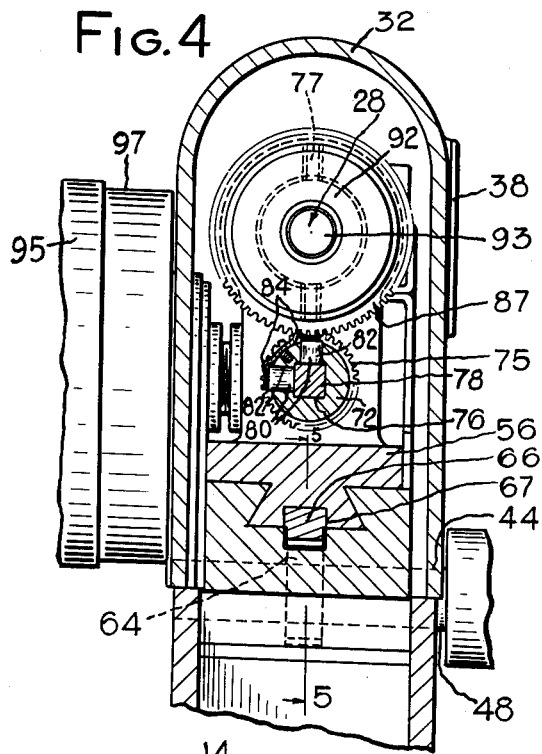
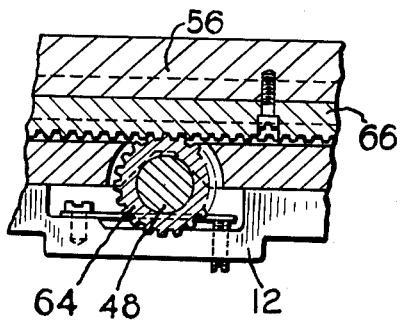
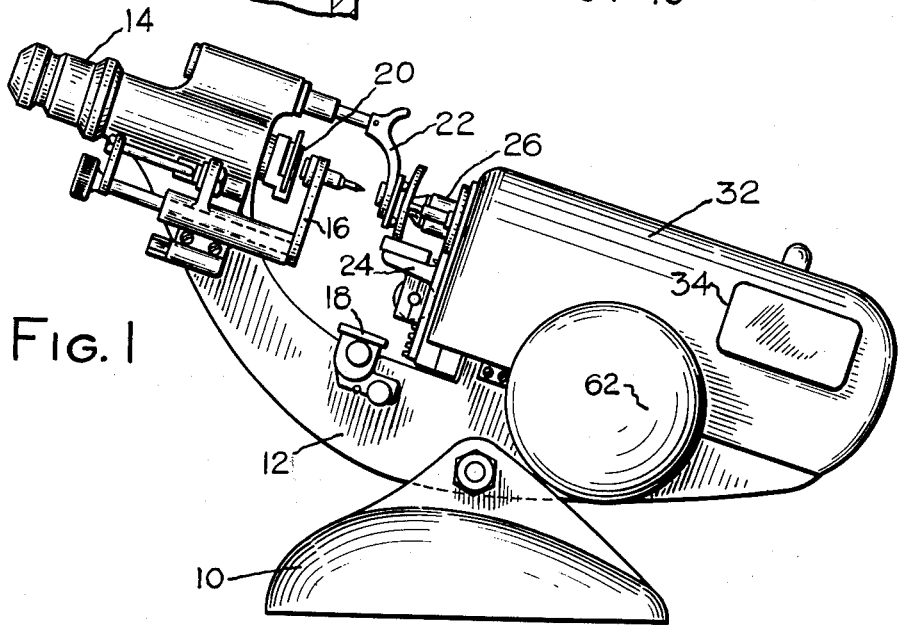
INVENTOR.
IRVING B. LUECK
BY
ATTORNEY

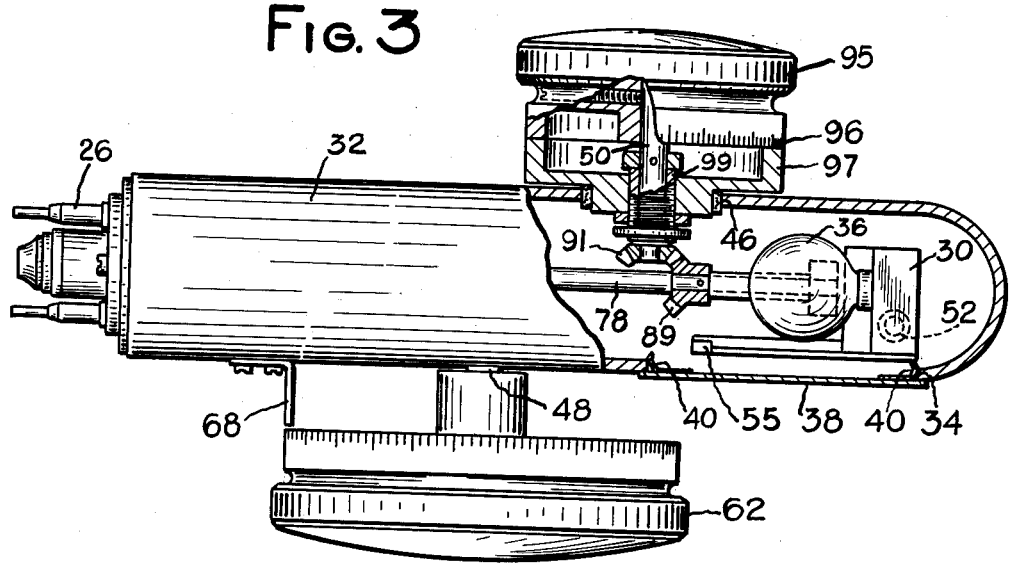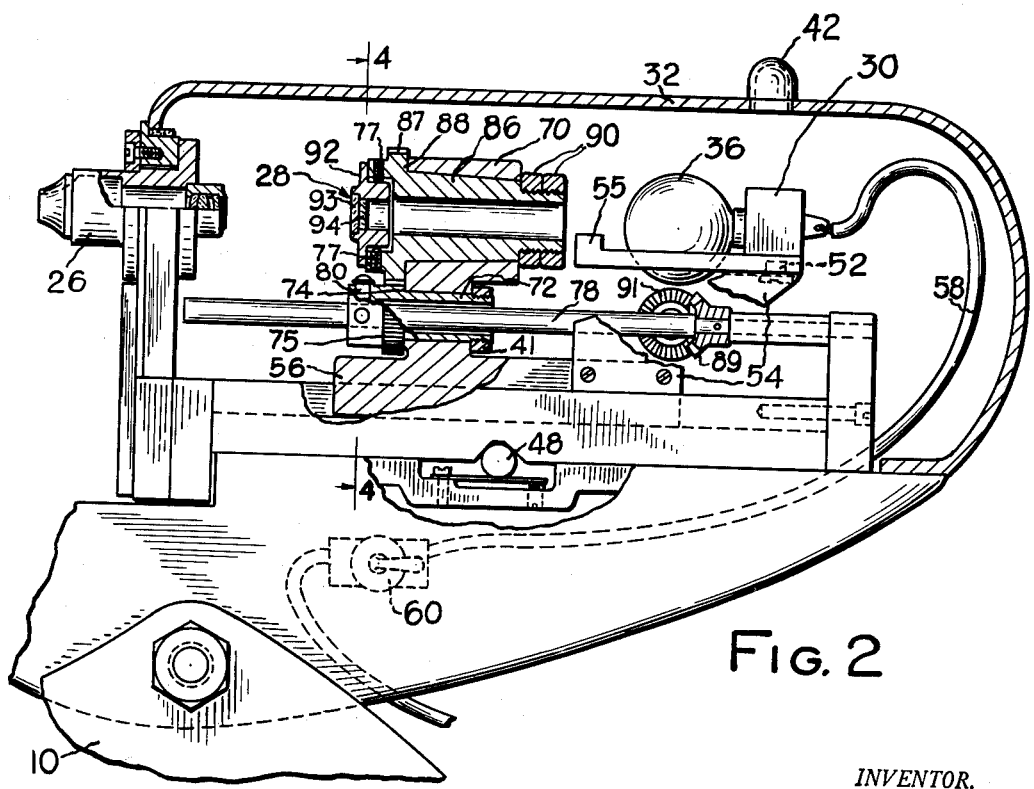

United States Patent Office 2,723,594
Patented Nov. 15, 1955

2,723,594
LENS TESTING INSTRUMENT

Irving B. Lueck, Perinton, N. Y., assignor to Bausch & Lomb Optical Company, Rochester, N. Y., a corporation of New York Application January 19, 1953, Serial No. 331,939

2 Claims. (Cl. 88—56)

This invention relates to optical apparatus and more particularly it has reference to devices for testing opthalmic lenses to determine unknown prescription characteristics thereof.

One object of this invention is to provide an improved lens testing device that is convenient and efficient in operation. Another object of this invention is to provide a testing device having improved mechanism so that a housing may be used to enclose certain critical parts to protect them against accidental misalignment. A further object of this invention is to provide a lens testing apparatus having improved means for rotating a target member about the axis of its optical system. And still a further object of the invention is to provide improved means for substantially eliminating backlash or lost motion between the actuating member and the target.

These and other objects an advantages reside in certain novel features of construction, arrangement and combination of parts as will hereinafter be more fully described and pointed out in the appended claims.

Referring to the drawings:

Fig. 1 shows a side elevation of a lens testing and marking device embodying my invention, Fig. 2 is a side view partially in section of certain principal parts of the invention, Fig. 3 is a top view of the same with parts shown in section, and Fig. 4 is a sectional view taken along the line 4—4 of Fig. 2, Fig. 5 is a sectional view taken along the line 5—5 of Fig. 4.

Similar reference characters refer to similar parts throughout the several views of the drawings.

A preferred embodiment of my invention is illustrated in the drawings wherein 10 indicates a base supporting a frame 12. On one end of said frame is mounted a telescope 14, a lens marking mechanism 16, an inking pad 18, a supplemental prism lens support 20 and a spring loaded lens holding device 22. On the other end of the frame 12 is mounted a spectacle or lens elevating platform 24, a standard lens mount 26, a movable target 28, an illuminating means 30 and a housing 32 which encloses both the target 28 and the illuminating means 30. The lens holding device 22 holds a lens, whose prescriptive characteristics are unknown, against the one end of the standard lens mount 26. The telescope, unknown lens, standard lens, target and illuminating means all are disposed along the axis of the system in optically aligned relation.

The housing 32 has an opening 34 through which the light bulb 36 in the illuminating means 30 can be replaced. Fitting over the opening 34 is a cover 38 which in this embodiment is held in place by resilient snaps 40. In the top of the housing is a transparent red disc 42 which glows when the illuminating means is energized. Extending through an opening 44 in housing 32 is a shaft 48 for moving the target 28 along the axis of the optical system. Extending through an opening 46 in housing 32 is a shaft 50 for transmitting rotational motion to a set of gears for rotating the target about the optical axis of the system.

Mounted within the housing is the illuminating means 30 pivotally mounted at 52 to a bracket 54. Said illuminating means may be swung about pivot 52 by handle 55 to move the light bulb 36 to the opening 34 for replacement of said bulb. The bracket 54 supporting the illuminating means 30 is attached to the sliding head 56 to move together along the optical axis of the system. A flexible wire 58 connects said illuminating means to a switch 60.

Attached to shaft 48 is a pinion 64 which engages with a rack 66 secured in a groove 67 in the bottom of sliding head 56. An index marker 68 is mounted on the frame in operative relation with a calibrated drum 62 which is secured to shaft 48. Rotation of the drum 62 will move the sliding head 56, carrying the target 28 and illuminating means 30, along the axis of the system so that the power of the unknown lens can be read on the drum 62 at the indicator 68. The drum is calibrated in diopters so that direct reading of the power of an unknown lens can be made after a setting has been reached.

Upwardly extending from the sliding head 56 is a mounting 70 in the lower portion of which there is journaled a tube 72 having a collar 74 spaced inwardly from one end. Built up from said collar 74 is a spur gear 75 extending around the periphery of the tube. Said collar is held loosely against mounting 70 by a nut 41 on the opposite end of the tube. Said tube 72 has a square or other non-circular shaped opening 76 for slidably receiving a correspondingly shaped shaft 78 therethrough. The sliding head 56 and tube 72 will slide on the non-circular shaft 78 along the optical axis of the system. To reduce backlash or lost motion between shaft 78 and tube 72, a pair of non-compressible plugs 80 are held by resilient means 84 against the non-circular shaft 78 through openings 82 in tube 72. The close fit between the shaft 78 and tube opening 76 plus the pressure of the plugs 82 holding the shaft firmly against the opposite walls of the tube will substantially reduce backlash or lost motion between the shaft and the tube.

Journaled in the upper part of mounting 70 is a tapered hollow member 86 having a collar 88 held against mounting 70 by nuts 90. Around the periphery of the collar 88 is a spur gear 87 in mesh with the spur gear 75 of tube 72. The mounting 92, carrying the indicia plates 93, 94, is adjustably held in the hollow member 86 by means of screws 77. The indicia on the plates 93, 94 combine to form the target for the device.

Extending through the opening 46 in the housing is an actuator or shaft 50 having actuating knob 95 in one end thereof. Around the knob 95 are calibrations 96 registrable with an index on the fixed member 97 for indicating the number of degrees from normal the target 28 has been rotated. The shaft or actuator 50 is disposed perpendicular to the plane of the vertical axis of the system and rotates in a bearing 99. Attached at the inner end of the shaft 50 is a bevel gear 91 mating with a bevel gear 89 on non-circular shaft 78. Rotation of the actuating knob 95 will act through the bevel gears 89, 91, non-circular shaft 78 and spur gears 75, 87 to rotate the target 28 about the axis of the system.

It is readily apparent that the present invention improves the operation of the target by mounting the actuator for rotational motion separate from the target on a shaft that is perpendicular to the plane of the optical axis of the system. The actuating knob for producing the rotational movement of the target is conveniently located on the side of the frame for easy operation without the necessity of resting the hand on the target as was previously required. With both the actuating knob for rotational motion and the drum for axial motion of the target mounted on the sides of the apparatus, an operator may perform all operations necessary to analyze a lens by resting his for arms or elbows on the table while adjusting the target. This convenient arrangement enables an operator to perform continuous tests on various lenses without the fatigue incident in the prior devices where it was necessary to hold one arm above the instrument to rotate the target. The new position of the rotational actuating knob further aids in maintaining the target in accurate alignment by permitting the target to be enclosed by a cover. In previous devices, the weight of the operator's hand and arm on the exposed target soon misaligned the whole apparatus.

From the foregoing, it will be apparent that I am able to provide a convenient and efficient device of the character described embodying improved means for testing prescriptive characteristics of unknown opthalmic lenses. Various modifications can obviously be made without departing from the spirit of my invention as pointed out in the appended claims.

I claim:

1. In a lens testing instrument the combination of a support, a lens system carried at the front end of the support, a head slidably mounted for movement along the support, a target rotatably carried by the head in alignment with the lens system, a light source carried by the head for illuminating the target, means for moving the head comprising a rotatable shaft operatively connected to the head and projecting laterally from one side of the support, an indicia carrying drum mounted on the projecting end of the shaft, means for rotating the target comprising an elongated shaft extending along the support, means operatively connecting the elongated shaft to the target for rotation of the latter, an actuating shaft rotatably mounted on the support at a point which is rearwardly of the first named shaft, said actuating shaft being operatively connected to the elongated shaft and extending laterally of and on the other side of the support, and an indicia carrying drum mounted on the actuating shaft whereby the head and the target may be moved by indicated amounts by turning of the drums on the respective sides of the support.

2. In a lens testing instrument the combination of a support, a lens system carried at the front end of the support, a head slidably mounted on the support, means for moving the head comprising a rotatable shaft extending laterally on one side of the support, means operatively connecting the shaft to the head whereby rotation of the shaft will move the head along the support, a drum carried by the shaft, indicia means on the drum for indicating the amount of movement of the head, a target aligned with the lens system and rotatably mounted on the head, a light source carried by the head for illuminating the target and means for rotating the target comprising an elongated, rotatable shaft extending longitudinally of the support, means operatively connecting the elongated shaft to the target for transmitting rotational motion of the shaft to the target, an actuator shaft extending laterally of the support on the other side thereof and rearwardly of the first named shaft, gear means operatively connecting the elongated shaft to the actuator shaft, and an indicia carrying drum mounted on the actuator shaft whereby the head and the target may be moved by indicated amounts by rotation of the drums on the respective sides of the support.

UNITED STATES PATENTS

References Cited in the file of this patent

| | | |
|---|---|---|
| 1,281,717 | Troppman | Oct. 15, 1918 |
| 2,304,814 | Glasser | Dec. 15, 1942 |